United States Patent [19]

Pez

[11] E Re. 29,368

[45] Reissued Aug. 23, 1977

[54] METAL-ORGANO COMPOUNDS WITH STERICALLY EXPOSED METAL-METAL BONDS, AND A METHOD FOR THEIR PRODUCTION

[75] Inventor: Guido P. Pez, Boonton, N.J.

[73] Assignee: Allied Chemical Corporation, Morris Township, N.J.

[21] Appl. No.: 631,777

[22] Filed: Nov. 13, 1975

Related U.S. Patent Documents

Reissue of:

[64] Patent No.: 3,776,932
Issued: Dec. 4, 1973
Appl. No.: 180,144
Filed: Sept. 13, 1971

[51] Int. Cl.[2] ..... C07F 7/00; C07F 7/28

[52] U.S. Cl. ..... 260/429.3; 55/387; 260/429 CY; 260/429.5; 260/346.11

[58] Field of Search ..... 260/429.5, 429 CY, 429.3, 260/429 R

[56] References Cited

U.S. PATENT DOCUMENTS

| | | | |
|---|---|---|---|
| 2,922,803 | 1/1960 | Kaufman | 260/429 CY |
| 3,032,659 | 5/1962 | Freeman et al. | 260/429 CY |
| 3,064,020 | 11/1962 | Riemschneider | 260/429 CY |
| 3,088,960 | 5/1963 | Wollensak | 260/429 CY |
| 3,306,917 | 2/1967 | Shapiro et al. | 260/429 CY |

OTHER PUBLICATIONS

Watt et al., J.A.C.S. 88, 1138–1140 (1966).
Watt et al., J.A.C.S. 92, 826–828 (1970).
Bercaw et al., J.A.C.S. 91, 7301–7306 (1969).
Watt et al., J.A.C.S. 88, 5926–5927 (1966).
Salzmann et al. Helv. Chem. Acta. V50, 1831–1836 (1967).
Brintzinger, J.A.C.S. 94 (4) 1233–1238 (1972).
Cotton, Prog. In. Inorg. Chem. V9, pp. 9 to 11 & 30 to 37 (1968).
Marvich et al., J.A.C.S. 93, 2046–2048 (1971).
Brintzinger et al., J.A.C.S. 92, 1105–1107 (1970).
J.A.C.S. 92, 6182–6185 (1970).
Chemical Abstracts vol. 67, 108729s (1967).
Chemical Abstracts, vol. 63, 19376c (1965).
Chemical Abstracts, vol. 72, 132939j (1970).
J. Amer. Chem. Soc., vol. 76, pp. 2278–2279 (1954).
Inorganica Chimica Acta, vol. 1, pp. 65–66 (1967).

*Primary Examiner*—Helen M. S. Sneed
*Attorney, Agent, or Firm*—Robert A. Harman; Arthur J. Plantamura

[57] ABSTRACT

Metal-organo complex characterized as having at least one sterically exposed metal-metal bond, and having the structure:

$$R_nM{\equiv}{\equiv}{\equiv}M'R_n$$

wherein R represents a ligand which may contain one or more atoms of carbon, hydrogen, oxygen, nitrogen, sulfur or phosphorus; n is an integer of from 1 to 3; M and M' each represent the same or a different transition metal; and the symbol ≡≡≡ represents at least one sterically exposed metal-metal bond.

The preparative method involves the low temperature reaction between an alkali metal naphthalene in an ethereal solvent, with the dihalogenide of at least one metal-organic species. The reaction mixture is allowed to slowly warm to ambient temperatures, the solvent is evaporated, and the naphthalene sublimed at temperatures below 40° C. The remaining crude product is extracted with an organic solvent, the extract is separated from the insoluble portion, and the product recovered by evaporating the solvent.

The metal-organo complex has utility as an absorbent of nitrogen when present as a contaminant in argon.

*When M and M' in the above formula are both titanium, and R is cyclopentadienyl, and n is 2 the above preparative method results in a metal-organo complex, as above defined, wherein pairs of the ligands are pi-bonded to each titanium atom, and one of these four ligands bridges the two titanium atoms by a pi-bond to one titanium and a sigma-bond to the other.*

16 Claims, 1 Drawing Figure

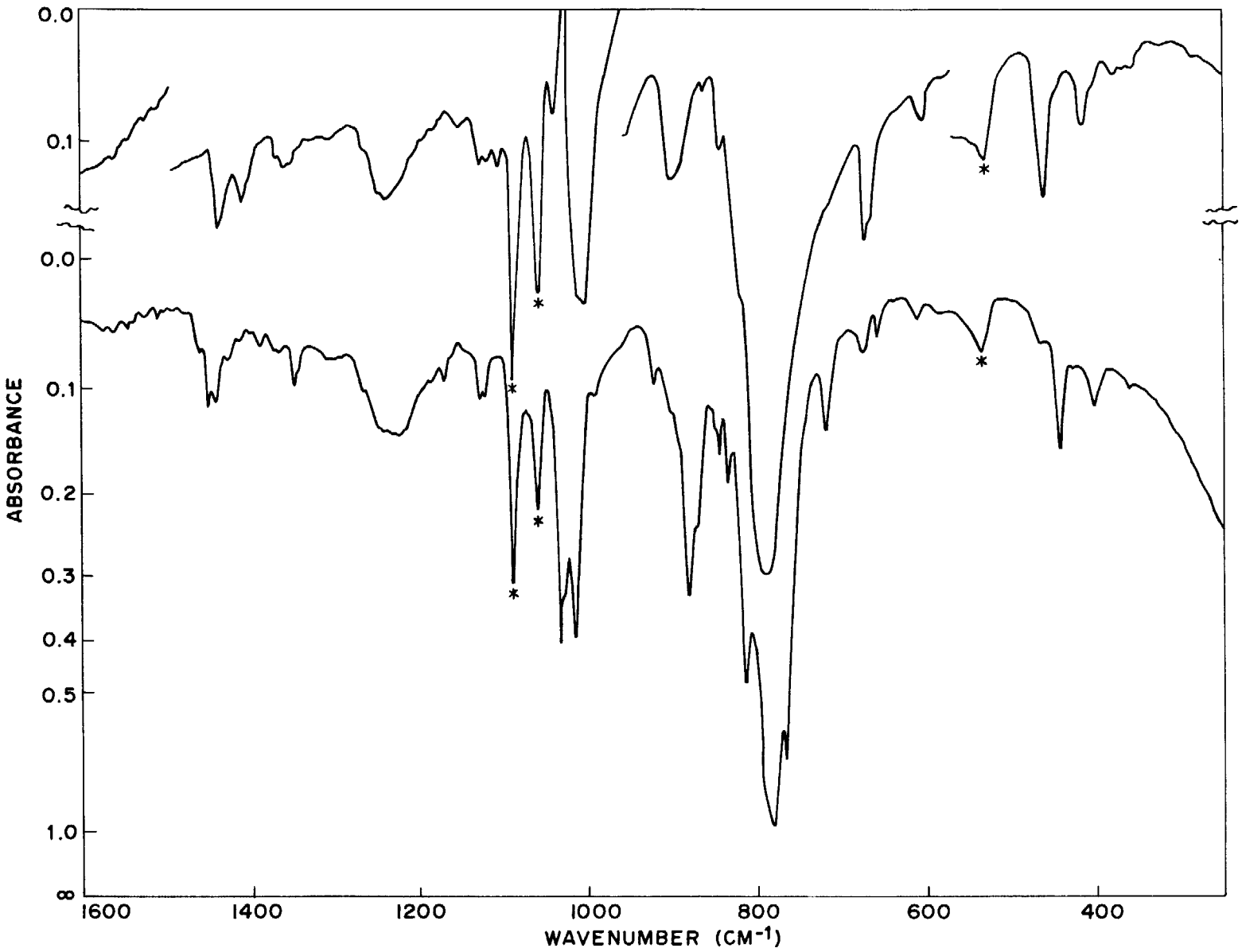
ABSORBANCE
0.0
0.1
0.0
0.1
0.2
0.3
0.4
0.5
1.0
∞
1600
1400
1200
1000
800
600
400
WAVENUMBER (CM⁻¹)

METAL-ORGANO COMPOUNDS WITH STERICALLY EXPOSED METAL-METAL BONDS, AND A METHOD FOR THEIR PRODUCTION

Matter enclosed in heavy brackets [ ] appears in the original patent but forms no part of this reissue specification; matter printed in italics indicates the additions made by reissue.

BACKGROUND OF THE INVENTION

I. Field of the Invention

This invention relates to a metal-organo complex having at least one sterically exposed metal-metal bond, [and having] *herein represented by* the structure:

$$R_nM\equiv\equiv\equiv M'R_n$$

wherein R represents a ligand which contains one or more atoms of carbon, hydrogen, oxygen, nitrogen, sulfur or phosphorus; n is an integer of from 1 to 3; M and M' each represent the same or a different transition metal; and the symbol $$\equiv\equiv\equiv$$

represents at least one sterically exposed metal-metal bond.

This invention also relates to a method of synthesizing the above metal-organo complex.

II. Description of the Prior Art

In the early nineteen fifties a new class of organo metallic compounds was discovered, starting with dicyclopentadienyl iron or "ferrocene." Analogous compounds were seen prepared, similarly complexing a great many of the transition metals. Particular attention was focused on the titanium complex, reported to be dicyclopentadienyl titanium, and also referred to as "titanocene." At first this was thought to be a simple "sandwich" configuration, its essential structure being the symmetrical binding of the central metal atom to all five carbon atoms of each cyclopentadienyl ring.

In the mid sixties, it was found and confirmed that the material reported to be dicyclopentadienyl titanium was actually a dimer.

By 1970, it was reported (H. H. Brintzinger and J. E. Bercaw, JACS 92:21 pp. 6182–6185) that the metal-organo complex which various investigators had isolated, was not $[(C_5H_5)_2Ti]_2$ as had been erroneously reported, but its stable isomer, the hydride, $[(C_5H_5)(C_5H_4)TiH]_2$.

SUMMARY OF THE INVENTION

I have now found [that] *a compound closely related to* the true bis(dicyclopentadienyl titanium II), [$[(C_5H_5)_2Li]_2$, is a very active metastable isomer,] *and having the formula* $(C_5H_5)_3Ti_2(C_5H_4)$ which, by the employment of the process of [our] *my* invention, can be isolated. It is much more active than the more stable hydride, $[(C_5H_5)(C_5H_4)TiH]_2$ to which [isomer] it spontaneously reverts on heating. *The structure appears to be an attachment of pairs of cyclopentadienyl radicals by "pi" bonds to each of the titanium atoms with one of these radicals bridging the two titanium atoms by a "pi" bond to one titanium atom and by a "sigma" bond to the other titanium atom.*

[Bis(dicyclopentadienyl titanium II)] *The above described titanium complex* and the [analogous] complexes of several other transition metals *obtained by my preparative method* have at least one metal-metal sterically exposed bond. These bonds are responsible for the high degree of reactivity of the respective complexes toward small molecules such as hydrogen, nitrogen, carbon monoxide and aromatic hydrocarbons.

The preparative method of my invention may be applied to the production of [bis(dicyclopentadienyl titanium II)] *the above described titanium complex* as well as to [analogous] dimers having various ligands and similar or dissimilar transition metals with either single or multiple sterically exposed metal-metal bonds. The method of the present invention comprises a low temperature reduction of $(R)_2MX_2$, or a mixture of $(R)_2MX_2$ and $(R_2)M'X_2$ in an ethereal solvent where R represents the selected ligand; M a transition metal; M' a second transition metal, and X a halogen.

The preparative method may briefly be stated as follows:

An alkali metal naphthalene, generally prepared in situ, but prior to the addition of the dihalogenide which will furnish the ligands, is allowed to react in an ethereal solvent, in an inert atmosphere, and at temperatures below about −35° C. with the dihalogenide of at least one metal-organic species. The reaction mixture is allowed to gradually warm to ambient temperatures, the solvent is evaporated, and the naphthalene sublimed, both operations being carried out under reduced pressure, and at temperatures below 40° C. The residue obtained is extracted with an organic solvent, or a mixture of solvents, and the product metal-organo complex obtained by removal of the solvent. The highly active product must be protected from oxygen, and if wet with solvent, it must also be protected from nitrogen, with which it will then react.

DESCRIPTION OF THE PREFERRED EMBODIMENTS

When reference is made herein to "transition metals," those metals are referred to in which an inner electron shell rather than an outer shell is partially filled. In the periodic table, those metals, the atoms of which are so structured, include elements 21 through 30 (scandium through zinc), 39 through 48 (yttrium through cadmium), 57 through 80 (lanthanum through mercury) and 80 through 103 (actinium through lawrencium).

When reference is made to "sterically expose metal-metal bonds," those metal-metal bonds are specified wherein the molecules have a spatial arrangement of their atoms such that the bond is readily available to another molecule with which it can react. There are not adjacent atomic structures to partially block or hinder a reaction.

When reference is made to a "ligand," we refer herein to those organic molecules, atoms or ions which are attached to one or the other of the metallic atoms designated herein as M and M' *by "sigma" or "pi" bonds as in the subject complexes, especially cyclopentadienyl and pinacolate.*

[The method of the present invention may be employed to produce such novel metal-organo compounds having metal-metal bonds, as bis(dicyclopentadienyl titanium II), bis(zirconium II pinacolate) and other analogous compounds having other transition metals and other ligands than the cyclopentadienyl and the pinacolate structures.]

In carrying out the method, an alkali metal, such as potassium, sodium or lithium is stirred with at least the stoichiometric amount of naphthalene in a substantially dry, oxygen-free ethereal solvent such as tetrahydrofuran (THF) or dimethyl ether. The operation is carried out in a reaction vessel from which the air or oxygen has been removed, or replaced with an inert atmosphere. Stirring is continued at about ambient temperature until the formation of the metal-naphthalene or "naphthalide" solution is essentially complete, and no appreciable quantity of the elemental alkali metal remains.

The solution is now cooled to a temperature within the range of −200° C. to −35° C., preferably between −200 and −150° C., and approximately the stoichiometric quantity of the dihalogenide of at least one metal-organic species such as $(C_5H_5)_2TiCl_2$ (dicyclopentadienyl titanium dichloride) $[(CH_3)_2CO]_2ZrCl_2$ (dichlorozirconium pinacolate) or $(C_5H_5)_2MoBr_2$ (dicyclopentadienyl molybdenum dibromide) are added. Additional ethereal solvent is generally added at this point. Although not essential to the process, it serves to rinse the last of the charge of solid dihalogenide into the reactor.

The temperature is next raised to, and maintained within the range of −100 and −35° C., preferably between −90 and −70° C., for from 2 to 60 hours, preferably from 30 to 50 hours. Following this, the temperature is raised to and maintained between −55 to −25° C., preferably within the range of −50 to −40° C. for between 2 to 30 hours, preferably between 10 and 25 hours, then allowed to warm to ambient temperatures over a period of from 1 to 60 hours, preferably from 30 to 50 hours. This slow warming period, as well as the low temperatures employed during the reaction are features of the present invention. If prepared at ambient temperatures an inordinate amount of the [isomeric] hydride, $[(C_5H_5)(C_5H_4)TiH]_2$, would be produced; and if the batch were rapidly warmed to ambient temperatures, the product yield would be adversely affected.

The ethereal solvent and naphthalene are next removed by distillation and sublimation in a system, from which the gaseous atmosphere has been evacuated, at temperatures below 40° C., preferably between 25 and 35° C. The remaining crude residue is solvent extracted at temperatures between *minus* 95° C. and ambient temperature, preferably between −90 and −70° C. to obtain the product. A product assaying at least 80% can be obtained by the above procedure.

This product can be brought to a purity of better than 96% by additional solvent extractions.

The organic extraction solvents may be aliphatic or aromatic hydrocarbons, or a mixture of both. Benzene and toluene are effective, but toluene is preferred because benzene solidifies at 5.5° C., and can therefore, be employed only when the extractions are carried out above its freezing point.

Since toluene displays a certain affinity for these products, it is preferred that an aliphatic hydrocarbon having a higher boiling point than toluene, and displaying substantially no affinity for the product, such as octane, be added to the extract before it is taken to dryness. With this modification, the toluene, having a lower boiling point, is removed first, and a dry, free-flowing product is thereby obtained. There are, of course, many suitable combinations of solvents which bear this desired relationship.

In preparing [bis(dicyclopentadienyl titanium II)] *the above described titanium complex with cyclopentadienyl ligands* by the above procedure, it is found that this product has considerably greater solubility in toluene, which is the preferred solvent, than does the less reactive [isomeric] hydride $[(C_5H_5)(C_5H_4)TiH]_2$, which is present as a contaminant.

The following examples, in which parts are by weight, are illustrative of the novel compounds prepared, and of the method of this invention which is employed in their preparation.

EXAMPLE 1

Five parts by weight of elemental potassium and 18 parts of naphthalene are charged into an agitated jacketed vessel, under an argon atmosphere. 178 parts of dry, oxygen-free tetrahydrofuran (THF), are distilled directly into the vessel, and the mixture is agitated at 20° C. for 24 hours, after which period the potassium naphthalene solution is complete with no unreacted potassium metal remaining. The solution is now cooled to −196° C. and 15.3 parts of solid dicyclopentadienyl titanium dichloride are added, together with 300 parts of additional THF. All air is evacuated from the system, and agitation is maintained throughout the operation.

The mixture is now warmed to −80° C. and maintained at this temperature with agitation for 48 hours. Next, the temperature is raised to and maintained at −45° C. for 24 hours with agitation. The reaction mixture is then allowed to warm slowly to room temperature with agitation, over a period of 48 hours.

The THF is next distilled off in the absence of air or any gaseous atmosphere at a temperature of 20° C., and subsequently the naphthalene is removed by sublimation under vacuum at a temperature of 35° C. The remaining material is a dry, green to black crude product.

The dark product obtained is now twice extracted at −80° C., each time with 173 parts of toluene. The combined, filtered extracts are evaporated under vacuum at ambient temperature to one quarter of the original combined volume, and 70 parts of octane are added to the concentrated extract with agitation. The extract is now evaporated to dryness under vacuum at ambient temperature. Throughout these concentrations and evaporations, great care is exercised to exclude air (both oxygen and nitrogen) from the system.

Since the toluene has the lower boiling point of the two solvents employed, it is first removed, leaving the product as a slurry in octane. In order to insure that all the toluene is displaced, a second 70 parts of octane are added, then the slurry is taken to dryness under vacuum at ambient temperature. The product is found to contain 81% [bis(dicyclopentadienyl titanium II)] *of the subject titanium complex having cyclopentadienyl radicals.* Subsequently, the assay is brought to 96% by re-extracting the product with toluene.

*This product "A" can be further purified by crystallization from tetrahydrofuran ("THF") at controlled temperature by controlled addition of a poor solvent such as hexane. Examination of a single crystal of the resulting product "B" by X-ray diffraction, together with the infrared spectrogram of the compound, indicates the formula:*

(B)

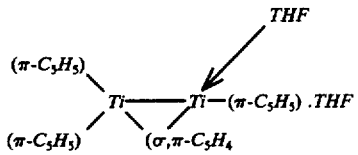

*(i.e., two titanium atoms linked by a sterically exposed metal-metal bond, with three pi-bonded cyclopentadienyl($C_5H_5$) radicals and one bridging (σ,π) cyclopentadienyl ($C_5H_4$) radical linked to one titanium atom by a sigma bond and to the other by a pi bond; and containing a coordinated THF molecule and a loosely associated THF molecule. When this tetrahydrofuran adduct "B" is dissolved in n-octane and the solution is evaporated to dryness, a gray-black solid "C" is obtained as the residue. Its infrared spectrum, powder X-ray diffraction pattern and proton nuclear magnetic resonance spectrum are the same as those of product "A"; the infrared spectrum shows that products "A" and "C" (which are believed to be identical) contain no tetrahydrofuran. It is believed that the structural formula of this product is:*

(A, C)

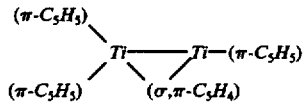

*The infrared spectrum characteristic of the solvent-free product of the above procedures, i.e. products "A" and "C" above, is represented by the upper curve in the accompanying drawing. The lower curve represents the infrared spectrum of the crystalline product containing tetrahydrofuran adduct, i.e. the product identified as "B" above. In the drawing, the asterisks mark bonds due to n-hexadecane-$d_{34}$ (i.e. deuterated n-hexadecane) used for preparing the mulls on which the spectra were taken.*

*The Table below shows Debye-Scherrer X-ray diffraction data (Bragg spacing, D, in Angstroms and relative intensity $I/I_1$ of diffracted beam vs. major line normalized to 100) taken on the above product "C".*

*DEBYE-SCHERRER X-RAY DIFFRACTION DATA ON PURE $(C_5H_5)_3(C_5H_4)Ti_2$ AS PREPARED FROM CRYSTALLINE $(C_5H_5)_3(C_5H_4)Ti_2(C_4H_8O).C_4H_8O$*

TABLE

| D(Å) | $I/I_1$ |
|---|---|
| 7.25 | 40 |
| 6.57 | 13 |
| 6.18 | 100 |
| 5.62 | 4 |
| 5.26 | 18 |
| 5.14 | 15 |
| 4.86 | 9 |
| 4.58 | 24 |
| 4.39 | 32 |
| 4.28 | 8 |
| 3.94 | 22 |
| 3.61 | 4 |
| 3.41 | 6 |
| 2.97 | 3 |
| 2.55 | 8 |
| 2.49 | 13 |
| 2.35 | 5 |
| 2.28 | 6 |
| 2.23 | 13 |
| 2.09 | 12 |
| 1.93 | 10 |

The product [is identified as the true bis(dicyclopentadienyl titanium II) by its infrared spectrum, its reaction] *reacts* with molecular nitrogen, [the substantially quantitative isomeric rearrangement of the product] *and partially converts over* to the hydride $[(C_5H_5)(C_5H_4)TiH]_2$ after prolonged heating at 100° C. [, its elemental analysis, and its molecular weight determination.]

EXAMPLE 2

Three parts by weight of elemental sodium and 18 parts of naphthalene are charged into an agitated jacketed vessel under an argon atmosphere. 178 parts of dry, oxygen-free liquified dimethyl ether are distilled directly into the vessel, and the mixture is agitated at 20° C. for 24 hours, after which period the sodium naphthalene solution is complete with no unreacted sodium metal remaining. The solution is now cooled to −196° C. and 24 parts of solid zirconium dibromo pinacolate are added, together with 300 parts of additional liquid dimethyl ether. All air is evacuated from the system, and agitation is maintained throughout the operation.

The mixture is now warmed to −80° C. and maintained at this temperature with agitation for 48 hours. Next, the temperature is raised to and maintained at −45° C. for 24 hours with agitation. The reaction mixture is then allowed to warm slowly to room temperature with agitation over a period of 48 hours, and the volatile dimethyl ether distills off. The naphthalene is sublimed at 35° C. under vacuum. The remaining residue is extracted with toluene at −80° C. in the same manner as in Example 1.

The product is identified as containing bis(zirconium II pinacolate).

EXAMPLE 3

One part by weight of elemental lithium and 19 parts of naphthalene are charged into an agitated jacketed vessel under an argon atmosphere. 178 parts of dry, oxygen-free THF are distilled directly into the vessel, and the mixture is agitated at 20° C. for 24 hours, after which period the lithium naphthalene solution is complete with no unreacted lithium metal remaining. The solution is now cooled to −196° C. and 27 parts of solid dicyclopentadienyl hafnium dichloride are added, together with 300 parts of additional THF. All air is evacuated from the system, and agitation is maintained throughout the operation. From this point on, the procedure is identical to that of Example 1, the same temperatures, period of agitation and method of isolating the final product by extraction being used.

The product is identified as containing bis(dicyclopentadienyl hafnium II).

It is apparent that many different embodiments can be made in this invention without departing from the spirit and scope thereof. Therefore, it is intended to be limited only as indicated in the appended claims.

I claim:

[1. A metal-organo complex having at least one sterically exposed metal-metal bond and having the structure:

$$R_nM \equiv\equiv\equiv M'R_n$$

where R represents the cyclopentadienyl ligand; n is an integer of from 1 to 3; M and M' each represent the same or a different transition metal selected from the group consisting of titanium, zirconium, hafnium, molybdenum and tungsten, and the symbol

≡≡≡ represents at least one sterically exposed metal-metal bond.]

[2. The metal-organo complex of claim 1 wherein both M and M' are titanium.]

[3. The metal-organo complex of claim 1 wherein both M and M' are zirconium.]

[4. The metal-organo complex of claim 1 wherein both M and M' are hafnium.]

[5. The metal-organo complex of claim 1 wherein both M and M' are tungsten.]

[6. The metal-organo complex of claim 1 wherein both M and M' are molybdenum.]

[7. The metal-organo complex of claim 1 wherein M is titanium and M' is molybdenum.]

[8. The metal-organo complex of claim 1 wherein M and M' are both titanium and R is the cyclopentadienyl ligand.]

[9. The metal-organo complex of claim 1 wherein M and M' are both zirconium and R is the cyclopentadienyl ligand.]

[10. The metal-organo complex of claim 1 wherein M and M' are both hafnium and R is the cyclopentadienyl ligand.]

[11. A method for preparing a metal-organo complex having at least one sterically exposed metal-metal bond having the structure:

$$R_nM\equiv\equiv\equiv M'R_n$$

wherein R represents the cyclopentadienyl ligand; n is an integer of from 1 to 3; M and M' each represent the same or a different transition metal selected from the group consisting of titanium, zirconium, hafnium, molybdenum and tungsten; and the symbol $$\equiv\equiv\equiv$$

represents a single or multiple, sterically exposed metal-metal bond, which comprises:

(a) admixing a halogenide of the metal-organo compound selected to supply the desired ligand, with a cold ethereal solvent solution of potassium, sodium or lithium naphthalene at a temperature between −200° C. and −25° C. and agitating the mixture for at least 2 hours;

(b) gradually warming the reaction mixture during a period of at least two hours to substantially ambient temperature;

(c) removing the ethereal solvent and excess naphthalene at temperatures under 40° C; and (d) extracting the residue at a temperature not exceeding 40° C. to obtain the metal-organo complex.]

12. The method of claim [11] *27* wherein the sodium, potassium or lithium naphthalene is prepared in situ, in the ethereal solvent, by agitating the elemental metal and the naphthalene in said solvent as a reaction medium, prior to the addition of the halogenide.

13. The method of claim [11] *27* wherein both M and M' are titanium.

14. The method of claim [11] *27* wherein both M and M' are zirconium.

15. The method of claim [11] *27* wherein both M and M' are hafnium.

16. The method of claim [11] *27* wherein both M and M' are tungsten.

17. The method of claim [11] *27* wherein both M and M' are molybdenum.

18. The method of claim [11] *27* wherein M is titanium and M' is molybdenum.

19. The method of claim [11] *27* wherein the mixing of the halogenide of the metal-organo compound selected to supply the desired ligand, with the cold ethereal solvent solution of potassium, sodium or lithium naphthalene, is effected at a temperature of −200° C. to −150° C., and the mixture is agitated at a temperature of between −100° C. and −35° C. for a period of between 2 and 60 hours, then at a temperature between −55° C. and −25° C. for a period of between 2 and 30 hours, and then is allowed to warm to ambient temperature over a period of from 1 to 60 hours.

20. The method of claim 19 wherein the mixture is agitated at a temperature of between −90° C. and −70° C. for a period of between 30 to 50 hours, then at a temperature of between −50° C. and −40° C. for a period of between 10 and 25 hours, and then is allowed to warm to ambient temperature over a period of from 30 to 50 hours.

21. The method of claim [11] *27* wherein the ethereal solvent is selected from the group consisting of tetrahydrofuran, dimethyl ether, and 1,2-dimethoxyethane.

22. The method of claim [11] *27* wherein the residue is extracted with an aromatic hydrocarbon at a temperature below −35° C., is separated from any remaining insoluble matter, and is at least partially concentrated.

23. The method of claim 21 wherein a quantity of a volatile aliphatic hydrocarbon for which the product has less affinity than for the chosen aromatic hydrocarbon solvent, and which has a higher boiling point than the chosen aromatic solvent, is added to the partially concentrated extract, and wherein the combined hydrocarbon solvent extract is then evaporated to dryness at temperatures below 40° C., thereby providing the metal-organo complex product.

24. The method of claim 22 wherein the aliphatic hydrocarbon added to the extract is selected from the group consisting of pentane, octane and hexane.

*25. A metal-organo complex having the structural formula*

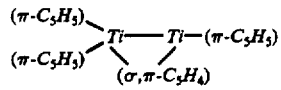

*and giving the infrared spectrum represented by the upper curve of the accompanying drawing and giving the X-ray diffraction data shown in the herein table of Bragg spacing and relative intensity.*

*26. The metal-organo complex of claim 25 containing tetrahydrofuran adduct and giving the infrared spectrum represented by the lower curve of the accompanying drawing.*

*27. A method for preparing a metal-organo complex having at least one sterically exposed metal-metal bond having the structure:*

$$R_nM\equiv\equiv\equiv M'R_n$$

*wherein R represents the cyclopentadienyl ligand; n is an integer of from 1 to 3; M and M' each represent the same or a different transition metal selected from the group consisting of titanium, zirconium, hafnium, molybdenum and tungsten; and the symbol*

$$\equiv\equiv\equiv$$

*represents a single or multiple, sterically exposed metal-metal bond, which comprises:*

*(a) admixing a halogenide of the metal-organo compound selected to supply the desired ligand, with a cold substantially dry, oxygen-free ethereal solvent solution of potassium, sodium or lithium naphthalene at a temperature between −200° C. and −25° C. in a reaction vessel from which air or oxygen has been removed or replaced with an inert atmosphere, and agitating the mixture for at least 2 hours;*

*(b) gradually warming the reaction mixture during a period of at least one hour to substantially ambient temperature;*

*(c) removing the ethereal solvent and excess naphthalene at temperatures under 40° C.; and*

*(d) extracting the residue at a temperature not exceeding 40° C. to obtain the metal-organo complex.*

* * * * *